July 17, 1962  H. F. STERLING ETAL  3,044,967
PRODUCTION OF PURE SEMI-CONDUCTOR MATERIAL
Filed Dec. 31, 1958
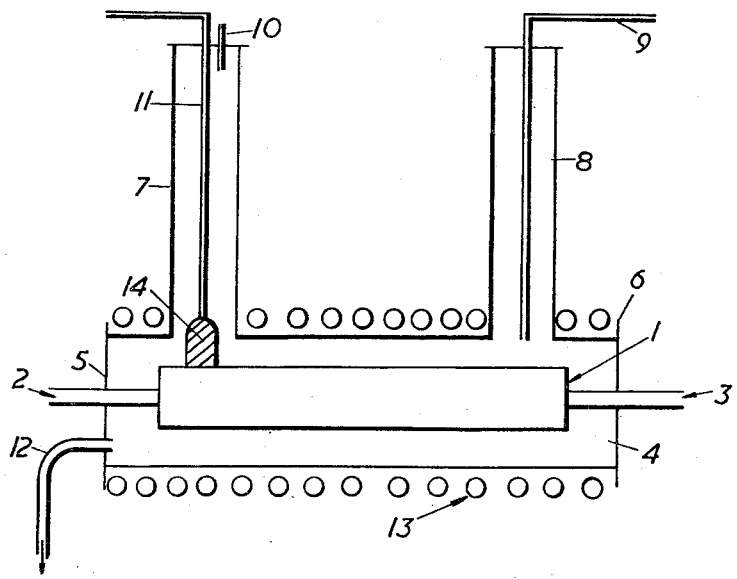
Inventors
H.F.STERLING - F.J.RAYMOND
By RPMorris
Attorney United States Patent Office 3,044,967
Patented July 17, 1962

3,044,967
PRODUCTION OF PURE SEMI-CONDUCTOR MATERIAL
Henley Frank Sterling and Frederick John Raymond, London, England, assignors to International Standard Electric Corporation, New York, N.Y.
Filed Dec. 31, 1958, Ser. No. 784,166
Claims priority, application Great Britain Jan. 6, 1958
6 Claims. (Cl. 252—500)

This invention relates to the production of semiconductor material.

In British patent specification No. 745,698 there is described and claimed a process of manufacture of substantially pure silicon which comprises the thermal decomposition of silane. This process has proved very successful because it has been found possible thereby to produce silicon of very high purity. In the process described and claimed it was, however, necessary to pass substantially pure silane in a molecular concentration substantially less than normal into a zone heated to a temperature at least equal to the decomposition temperature of silane in order to ensure that the greater part of the silane was decomposed substantially wholly upon a growing surface of a silicon body and to avoid a mainly gas phase decomposition which would be likely to introduce impurities into the silicon from the material of the vessel upon which the silicon is deposited.

In British patent specification No. 778,383 the method of causing decomposition of a hydride substantially wholly upon a heated surface was extended to the manufacture of a coherent body of a substantially pure element (other than silicon) for a semi-conductor.

In carrying out these inventions it has hitherto been found necessary to cause the semi-conductor element such as silicon to be deposited upon a comparatively restricted area heated by means of an electric induction coil.

The object of the present invention is to remove this limitation and thus to increase the rate of production of the semi-conductor material.

In the United States patent application Serial No. 708,100, filed January 10, 1958, there is described a method of processing fusible material such as silicon using a crucible with hollow walls of metal of high electrical and thermal conductivity (e.g. copper, silver or gold) cooled by circulating cooling fluid through the hollow walls, the semi-conductor material being melted by means of an electric induction coil surrounding the crucible. Eddy currents are induced both in the metal of the crucible and in the semi-conductor material therein. The currents induced in the latter melt the semi-conductor material. It has been found that silicon is not contaminated by the walls of the crucible.

According to the present invention there is provided a process for producing semiconductor material containing controlled amounts of significant impurities, including substantially pure semiconductor material. A charge of the material is placed in a crucible made from a metal of high electrical and thermal conductivity and cooled by means of a circulating fluid. A hydride of the semiconductor material, with or without a hydride of a significant impurity material, is then flowed over the surface of the material in the crucible, which is heated to such a temperature that the hydride or hydrides are decomposed. The resulting semi-conductor material, with or without a significant impurity material, is deposited on the surface of the material contained in the crucible.

One embodiment of the invention will be described with reference to the drawing accompanying this specification, as applied to the production of silicon.

The apparatus shown in the drawing is intended for the simultaneous decomposition of silane to silicon and the production of a rod of monocrystalline silicon by the slow withdrawal of a seed crystal from molten silicon contained within a crucible.

Referring to the drawing, a crucible 1 is shown, provided with pipes 2 and 3 for the passage of cooling water through the hollow walls thereof. The crucible 1 is supported within a cylindrical vessel 4 of quartz provided with end closures 5 and 6 through which pipes 2 and 3 are sealed. The vessel 4 is also provided with vertical cylinders 7 and 8 sealed thereto. The vertical cylinder 8 is closed at its upper end except for the passage of an inlet pipe 9, which extends downwards to a position a little above the crucible 1. The vertical cylinder 7 is closed at its upper end except for a short inlet pipe 10 sealed therethrough and a rod 11 the purpose of which will be explained hereinafter. A pipe 12 is sealed through the end closure 5 of the cylinder 4. An induction coil 13 surrounds the cylinder 4.

In operation a charge of silicon is placed in the crucible 1 and this silicon is heated by passing current through the coil 13. A susceptor heated by these currents is used initially to heat the silicon by radiation to a temperature at which its electrical resistance is sufficiently low to support eddy currents therein, after which the susceptor is withdrawn.

Silane gas is thereupon passed through this pipe 9 and a vacuum pump connected to the pipe 12. The silane may be mixed with inert gas to reduce its concentration or may be pumped in at full concentration and under pressure, depending upon the temperature to which the silicon present in the crucible is raised and upon the dictates of purity and/or efficiency of operation. The temperature of the silicon is raised to at least 500° C. and may be raised high enough to melt the silicon i.e. above 1420° C. The silane is decomposed by heat and silicon is deposited upon the surface of the silicon.

Hydrogen resulting from the decomposition of the silane, any carrier gas and any undecomposed silane are withdrawn through the pipe 12.

In order to produce a monocrystalline silicon rod a monocrystalline seed crystal is mounted on the end of rod 11 and means is provided for moving this rod upwards as the body 14 of monocrystalline silicon grows. At the same time an inert gas such as argon is passed into the inlet pipe 10 so that the crystal pulling takes place in an atmosphere of argon.

It is to be noted that the temperature of the silicon within the crucible 1 is not necessarily the same throughout. The silicon at the foot of the vertical cylinder 7; i.e. the portion from which a monocrystal is drawn, is maintained at a temperature at or only a little in excess of the melting point of silicon. The remainder of the silicon may or may not be maintained at the same temperature, for, as stated above, it may be maintained at any temperature within the range from 500° C. to a temperature just above the melting point depending upon the condition for decomposition of silane.

It is further to be noted that argon is circulated through the vertical cylinder 7 in sufficient quantity to ensure that any silane is excluded from the portion of the apparatus in which a monocrystal is being grown.

Although the above method and apparatus has been described for the production of silicon and the growing of a monocrystal of silicon, it will be clear that other pure semi-conductor elements may be produced thereby, from a corresponding hydride, with the necessary modifications to the temperature used. Moreover, it is clear that a layer of one semi-conductor element may be deposited upon a heated mass of another semi-conductor element by this method and apparatus.

To produce semiconductor material containing controlled amounts significant impurities, volatile hydrides of one or more of such impurities may be mixed with the semiconductor hydride entering the apparatus through the pipe 9. They should be present in a concentration in excess of that required in the final material since, as explained in British patent specification No. 778,383, owing to the relatively low concentration of the hydrides of the significant impurities 100% decomposition of these hydrides is not obtained. Examples of materials which act as significant impurities in the case of silicon and germanium, and which can be prepared in the form of hydrides and thermally decomposed, are boron, gallium, phosphorus, arsenic, antimony and bismuth. Gallium hydride in bulk is a liquid at ordinary temperatures but sufficient can be carried off in the gaseous state to be mixed with the hydride of germanum or silicon for the purpose of the process according to the present invention.

If the final semiconductor material is not required to be of monocrystalline formation then, of course, a multicrystalline seed crystal may be used in place of monocrystalline seed at the end of the rod 11. Alternatively the vertical cylinder 7 and rod 11 may be dispensed with and another means provided for removing molten material from the crucible 1. This may take the form of a simple "overspill device," whereby molten material flows from an outlet in the side of the crucible 1 whenever the quantity inside reaches a certain value. The molten portion is then gradually replenished by further melting of the solid material in the crucible.

When the semiconductor element within the crucible is to be melted, some care may be necessary not to use too great radio frequency power in the heating coil 13. Thus at the critical period of preheating up to the melting point the power must be adjusted so that local arcing between the material and the walls of the crucible does not occur. As germanium, for example, has a lower melting point than silicon less radio frequency power is needed for the former than for the latter.

While the principles of the invention have been described above in connection with specific embodiments, and particular modifications thereof, it is to be clearly understood that this description is made only by way of example and not as a limitation on the scope of the invention.

What we claim is:

1. A process for producing substantially pure semiconductor material using a metal crucible of high thermal conductivity comprising placing a charge of said material in said crucible, cooling said crucible, flowing a hydride of said material over the surface of the material contained in said crucible, and heating said material to the temperature of decomposition of the hydride while maintaining said crucible cooled, whereby the resulting semiconductor material is deposited on the surface of the material contained in said crucible and no contamination of said material by said crucible results.

2. A process for producing semiconductor material using a metal crucible of high thermal conductivity, said material containing controlled amounts of significant impurities comprising placing a charge of semiconductor material in a crucible, cooling said crucible, flowing a mixture of hydrides over the surface of the material in said crucible, said mixture consisting of a hydride of the semiconductor material together with at least one hydride of a significant impurity material, and heating said material to the temperature of decomposition of the hydrides in said mixture while maintaining said crucible cooled, whereby the resulting semiconductor material and significant impurity material are deposited on the surface of the material contained in said crucible and no contamination of said material by said crucible results.

3. A process according to claim 1 in which part of the material contained in said crucible is heated to the melting point.

4. A process according to claim 3 in which part of the molten material is continuously removed from the crucible, the melt being replenished by liquefaction of further solid material.

5. A process for producing substantially pure semiconductor material from a hydride thereof using a metal crucible of high thermal conductivity which comprises placing a charge of the material in said crucible, cooling said crucible, heating the charge to a temperature above the decomposition temperature of said hydride, at least a part being maintained at a temperature at least equal to its melting point, flowing the hydride over the heated charge such that said hydride is decomposed and the resultant semiconductor material is deposited on the surface of the charge, and inserting a seed crystal into the molten material and growing a crystal of semiconductor material therefrom.

6. A process according to claim 5 in which said seed crystal is of monocrystalline formation and the resultant crystal is monocrystalline.

References Cited in the file of this patent

UNITED STATES PATENTS

| 2,841,860 | Koury | July 8, 1958 |
| 2,871,533 | Swainson | Feb. 3, 1959 |

FOREIGN PATENTS

| 200,917 | Australia | Feb. 16, 1956 |